US009726938B2

(12) United States Patent
Sugiyama et al.

(10) Patent No.: US 9,726,938 B2
(45) Date of Patent: Aug. 8, 2017

(54) LIQUID CRYSTAL DISPLAY DEVICE (71) Applicant: Japan Display Inc., Tokyo (JP)

(72) Inventors: Saori Sugiyama, Tokyo (JP); Takanori Nakayama, Tokyo (JP); Yuki Kuramoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 16 days.

(21) Appl. No.: 14/881,749

(22) Filed: Oct. 13, 2015

(65) Prior Publication Data

US 2016/0103352 A1    Apr. 14, 2016

(30) Foreign Application Priority Data

Oct. 14, 2014  (JP) ................. 2014-210119

(51) Int. Cl.
  *G02F 1/1339*  (2006.01)
  *G02F 1/1335*  (2006.01)
  *G02F 1/1337*  (2006.01)

(52) U.S. Cl.
  CPC .... *G02F 1/13394* (2013.01); *G02F 1/133512* (2013.01); *G02F 1/133707* (2013.01); *G02F 2001/13396* (2013.01); *G02F 2201/52* (2013.01)

(58) Field of Classification Search
  CPC ..... G02F 2001/13396; G02F 1/133512; G02F 1/13394
  See application file for complete search history.

(56) References Cited

U.S. PATENT DOCUMENTS

| 2007/0008242 | A1 | 1/2007 | Mori et al. | |
| 2013/0342795 | A1* | 12/2013 | Park | G02F 1/133512 349/110 |
| 2014/0267986 | A1* | 9/2014 | Sugiyama | G02F 1/133512 349/106 |
| 2015/0359089 | A1* | 12/2015 | Lee | G02F 1/133512 174/268 |

FOREIGN PATENT DOCUMENTS

JP    2007-17619 A    1/2007

* cited by examiner

*Primary Examiner* — Kendrick Hsu
(74) *Attorney, Agent, or Firm* — TYPHA IP LLC (57) ABSTRACT Red pixels (R), blue pixels (B) and green pixels (G) are formed in parallel. First columnar spacers 10 and second columnar spacers 20 are formed on a first substrate. The distance between the first substrate and a second substrate in a normal state is determined by the first columnar spacers 10. The diameter of a light blocking film corresponding to each first columnar spacer 10 is greater than the diameter of a light blocking film corresponding to each second columnar spacer 20. The first columnar spacer 10 is not formed at a boundary between a green pixel (G) and a red pixel (R) or a boundary between a green pixel (G) and a blue pixel (B). The second columnar spacer 20 is formed at a boundary between pixels irrespective of the pixel color. Thus, appropriate color balance can be attained with ease without having a drop in the luminance.

8 Claims, 6 Drawing Sheets

LIQUID CRYSTAL DISPLAY DEVICE

CLAIM OF PRIORITY

The present application claims priority from Japanese Patent Application JP 2014-210119 filed on Oct. 14, 2014, the content of which is hereby incorporated by reference into this application.

BACKGROUND OF THE INVENTION

1. Field of the Invention

The present invention relates to a liquid crystal display device, and in particular, to a liquid crystal display device of the IPS (In-Plane Switching) type that excels in the white balance and is free of display unevenness.

2. Description of the Related Art

In a liquid crystal display device, a TFT substrate on which pixel electrodes, TFTs (Thin-Film Transistors), etc. have been formed in a matrix pattern and a counter substrate are arranged in facing relation to each other and a liquid crystal is sandwiched between the TFT substrate and the counter substrate. An image is formed on the liquid crystal display device by controlling the optical transmittance of liquid crystal molecules in regard to each pixel.

For display devices such as liquid crystal display devices, the color temperature of the white color is set appropriately depending on the purpose and/or the assembly manufacturer, and the transmittance values of red pixels (R), green pixels (G) and blue pixels (B) are controlled to suit the requested white color temperature.

JP-2007-17619-A describes a configuration in which a light blocking pattern in each pixel is changed in regard to the red pixels (R), the green pixels (G) and/or the blue pixels (B) in order to achieve a prescribed color temperature.

SUMMARY OF THE INVENTION

A method forming columnar spacers on the counter substrate is currently employed in order to determine the distance between the TFT substrate and the counter substrate. On the other hand, after the completion of the liquid crystal display device, if external pressure is applied to the counter substrate when the display device is in operation, the gap between the TFT substrate and the counter substrate fluctuates and that leads to display failure. To eliminate this problem, there exists a technology in which not only first columnar spacers for determining the distance (separation) between the TFT substrate and the counter substrate in the normal state but also second columnar spacers for making contact with the TFT substrate when pressure is applied to the counter substrate or the like are formed so as to withstand the pushing pressure by use of the second columnar spacers.

On the surfaces of the TFT substrate and the counter substrate contacting the liquid crystal, alignment layers for setting the initial alignment of the liquid crystal (liquid crystal molecules) are formed. Rubbing the surface of each alignment layer with a cloth-like material (the so-called "rubbing method") has been employed for the initial alignment of the liquid crystal molecules. In cases where the rubbing method is used, the existence of columnar spacers causes light leakage from the screen since parts of the alignment layer hidden by the columnar spacers do not undergo the rubbing. Such a light leakage part is also called "tailing" since the part is in a shape like the tail of a comet.

The sensitivity of the human eye (hereinafter referred to as "visual sensitivity") varies from color to color and is especially high for green. Since such light leakage occurring in a green pixel (G) stands out due to the human's visual sensitivity, conventional liquid crystal display devices have been designed so as not to form the columnar spacers at green pixels (G).

Light blocking (blockage of light) is necessary since the liquid crystal alignment is disturbed in parts around the columnar spacers. In the case where no columnar spacers exist in the green pixels (G), no light blocking regions corresponding to columnar spacers exist in the green pixels (G). In this case, the transmittance of the green pixels (G) becomes higher than those of pixels of the other colors, and consequently, the color balance of the white color is broken.

This problem has been resolved by purposely lowering the transmittance of the green pixels (G). However, this method leads to a decrease in the overall transmittance of the liquid crystal display device and a drop in the luminance. In other words, the conventional liquid crystal display devices have sacrificed the luminance of the screen because of the existence of a limitation on the adjustment of the white color temperature (color temperature of the white color).

The object of the present invention is to realize a liquid crystal display device capable of increasing the degree of freedom of the white color temperature adjustment (hereinafter referred to also as "color balance adjustment") and achieving higher luminance of the screen.

Principal means employed by the present invention achieving the above object are as follows:

(1) A liquid crystal display device comprising a first substrate having an alignment layer, a second substrate having an alignment layer, and a liquid crystal sandwiched between the first substrate and the second substrate. The alignment layers have undergone optical alignment treatment. First spacers and second spacers are formed between the first substrate and the second substrate, the second spacers having a lower height in the liquid crystal than do the first spacers. The number of the second spacers is greater than that of the first spacers. Red pixels (R) each having a red color filter, green pixels (G) each having a green color filter, and blue pixels (B) each having a blue color filter are arranged in parallel on the first substrate. The first spacer exists at a boundary between a red pixel (R) and a blue pixel (B). The second spacer exists at a boundary between a green pixel (G) and a red pixel (R), a boundary between a blue pixel (B) and a green pixel (G) or a boundary between a red pixel (R) and a blue pixel (B).

(2) A liquid crystal display device comprising a first substrate having an alignment layer, a second substrate having an alignment layer, and a liquid crystal sandwiched between the first substrate and the second substrate. The alignment layers have undergone optical alignment treatment. First spacers and second spacers are formed on either one of the first and second substrates. The number of the second spacers is greater than that of the first spacers. The first spacers are in contact with an opposing substrate in a normal state while the second spacers are not in contact with the opposing substrate in the normal state. Red pixels (R) each having a red color filter, green pixels (G) each having a green color filter, and blue pixels (B) each having a blue color filter are arranged in parallel on the first substrate. The first spacer does not exist at a boundary between a green pixel (G) and a blue pixel (B) or a boundary between a green pixel (G) and a red pixel (R). The second spacer exists at a boundary between a green pixel (G) and a red pixel (R), a boundary between a blue pixel (B) and a green pixel (G) or a boundary between a red pixel (R) and a blue pixel (B).

(3) The liquid crystal display device according to (1) or (2), wherein the first spacers and the second spacers are formed on the first substrate.

(4) The liquid crystal display device according to (1) or (2), wherein the number of the second spacers is ten times or more of that of the first spacers.

(5) The liquid crystal display device according to any one of (1)-(4), wherein the liquid crystal display device is an IPS (In-Plane Switching) type liquid crystal display device.

DESCRIPTION OF THE PREFERRED EMBODIMENTS

The viewing angle characteristics are an important issue with liquid crystal display devices. Among various types of liquid crystal display devices, those of the IPS (In-Plane Switching) type have excellent viewing angle characteristics since the transmittance of each pixel in the IPS type liquid crystal display device is controlled by rotating the liquid crystal molecules in a direction parallel to the substrate. Alignment methods for the alignment layers used for setting the initial alignment of the liquid crystal (liquid crystal molecules) include not only the aforementioned rubbing but also a method called "optical alignment", giving uniaxial anisotropy to the alignment layers by using polarized ultraviolet rays, for example. The IPS (In-Plane Switching) method, not needing the pretilt angle regarding the liquid crystal molecules, is suitable for the optical alignment.

By using the optical alignment method which is free of the light leakage caused by the rubbing shadow (imperfect rubbing of the parts hidden by the columnar spacers) in the rubbing method, the columnar spacers can be arranged also at green pixels (G). Accordingly, the degree of freedom of color balance adjustment increases.

Figure 1:
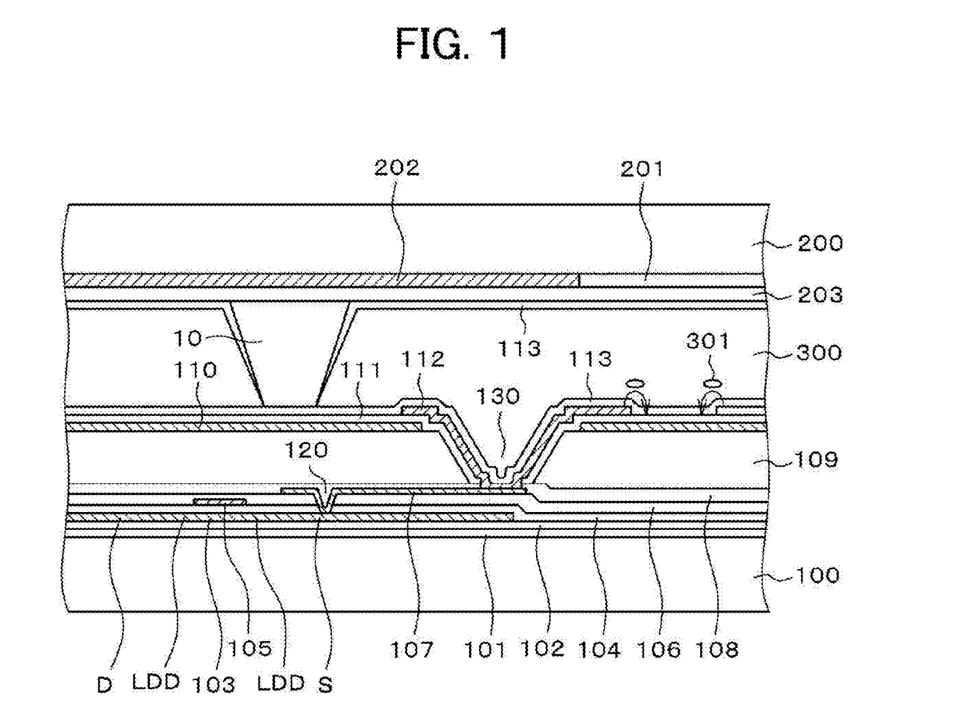
FIG. 1 is a cross-sectional view of an IPS type liquid crystal display device.

FIG. 1 is a cross-sectional view of a pixel part of an IPS type liquid crystal display device to which the present invention is applied. In FIG. 1, a first base film 101 made of SiN and a second base film 102 made of $SiO_2$ are formed on a glass substrate 100 by CVD (Chemical Vapor Deposition). The first base film 101 and the second base film 102 serve to prevent a semiconductor layer 103 from being contaminated by impurities from the glass substrate 100.

The semiconductor layer 103 is formed on the second base film 102. The semiconductor layer 103 is obtained by forming an a-Si film on the second base film 102 by CVD and then transforming the a-Si film into a poly-Si film by laser annealing. The poly-Si film is patterned by means of photolithography.

A gate insulation film 104 is formed on the semiconductor layer 103. The gate insulation film 104 is a $SiO_2$ film made by use of TEOS (tetraethoxysilane). This film is also formed by CVD. On the gate insulation film 104, a gate electrode 105 is formed. A scan line 10 shown in FIG. 2 also serves as the gate electrode 105. The gate electrode 105 is formed of a MoW film, for example. Al alloy is used when the resistance of the gate electrode 105 has to be low.

The gate electrode 105 is patterned by means of photolithography. In the patterning, a source S and a drain D are formed in a poly-Si layer by doping the poly-Si layer with an impurity such as phosphorus or boron by means of ion implantation. Further, by using the photoresist for the patterning of the gate electrode 105, an LDD (Lightly Doped Drain) layer is formed between a channel layer of the poly-Si layer and the source S or drain D.

Thereafter, a first interlayer insulation film 106 is formed of $SiO_2$ to cover the gate electrode 105. The first interlayer insulation film 106 is used for insulating the gate electrode 105 and a contact electrode 107 from each other. A contact hole 120 for connecting the source part S of the semiconductor layer 103 to the contact electrode 107 is formed through the first interlayer insulation film 106 and the gate insulation film 104. Photolithography for forming the contact hole 120 through the first interlayer insulation film 106 and the gate insulation film 104 is carried out concurrently.

The contact electrode 107 is formed on the first interlayer insulation film 106. The contact electrode 107 is connected to a pixel electrode 112 via a contact hole 130. The drain D of the TFT is connected to a video signal line which is formed in the same layer and at the same time as the contact electrode 107.

The contact electrode 107 and the video signal line (hereinafter represented by the contact electrode 107) are made by use of AlSi alloy, for example, in order to achieve low resistance. Since the AlSi alloy causes hillocks and/or diffusion of Al to other layers, a structure for sandwiching AlSi between a barrier layer of MoW and a cap layer is employed, for example.

The whole of the TFT is protected by forming an inorganic passivation film (insulation film) 108 to cover the contact electrode 107. The inorganic passivation film 108 is formed by CVD similarly to the first base film 101. An organic passivation film 109 is formed to cover the inorganic passivation film 108. The organic passivation film 109 is made of photosensitive acrylic resin. The organic passivation film 109 can also be made of materials other than acrylic resin, such as silicone resin, epoxy resin and polyimide resin. The organic passivation film 109 is formed to be thick since the film 109 has to serve as a planarization film. The film thickness of the organic passivation film 109 is 1 to 4 μm (2 to 3 μm in many cases).

The contact hole 130 is formed through the inorganic passivation film 108 and the organic passivation film 109 in order to establish conduction between the pixel electrode 112 and the contact electrode 107.

Photosensitive resin is used for the organic passivation film 109. If light exposure is performed on the photosensitive resin after being applied on a surface, only parts exposed to light dissolve in a particular developing solution. Thus, the formation of the photoresist can be left out by use of the photosensitive resin. After forming the contact hole 130 through the organic passivation film 109, the organic passivation film 109 is completed by baking the organic passivation film at approximately 230° C.

Thereafter, an ITO (Indium Tin Oxide) film to be shaped into a common electrode 110 is formed by sputtering and then patterning is conducted so as to remove the ITO from around the contact holes 130. The common electrode 110 can be formed in a planar shape to be shared by the pixels. Thereafter, a SiN film to be shaped into a second interlayer insulation film 111 is formed on the entire surface by CVD. Thereafter, in the contact hole 130, a contact hole for establishing conduction between the contact electrode 107 and the pixel electrode 112 is formed through the second interlayer insulation film 111 and the inorganic passivation film 108.

Thereafter, an ITO film is formed by sputtering and the pixel electrodes 112 are formed by patterning the ITO film. An alignment layer 113 is formed by applying an alignment layer material on the pixel electrodes 112 by means of flexographic printing, inkjet printing or the like and baking the applied material. The optical alignment method (e.g., irradiation with polarized ultraviolet rays) is used for the alignment treatment of the alignment layer 113.

When voltage is applied between the pixel electrode 112 and the common electrode 110, lines of electric force like those shown in FIG. 1 are generated. An image is formed on the screen by having the electric field rotate liquid crystal molecules 301 so as to control the amount of light passing through the liquid crystal layer 300 in regard to each pixel.

In FIG. 1, a counter substrate 200 is arranged to sandwich the liquid crystal layer 300 between the counter substrate 200 and the glass substrate 100. Color filters 201 are formed on the counter substrate 200. A color filter 201 is formed for each pixel, as a red color filter 201R, a green color filter 201G or a blue color filter 201B. A color image is formed by use of the red color filters 201R, the green color filters 201G and the blue color filters 201B. A black matrix 202 is formed to be situated between adjacent color filters 201. The black matrix 202 has functions such as prevention of light leakage at columnar spacer parts which will be explained later.

An overcoat film 203 is formed to cover the color filters 201 and the black matrix 202. The uneven surface of the color filters 201 and the black matrix 202 is planarized by the overcoat film 203.

On the overcoat film 203, columnar spacers 10 for determining the distance (separation) between the TFT substrate (glass substrate) 100 and the counter substrate 200 are formed. Specifically, the columnar spacers 10 include first columnar spacers 10 for determining the distance between the TFT substrate 100 and the counter substrate 200 in the normal state and second columnar spacers 20 for preventing the distance between the TFT substrate 100 and the counter substrate 200 from becoming excessively short when pushing pressure is applied to the counter substrate 200 (only a first columnar spacer 10 is shown in FIG. 1).

On the overcoat film 203, another alignment layer 113 (on the counter substrate 200's side) for setting the initial alignment of the liquid crystal (liquid crystal molecules) is formed. Although this alignment layer 113 is formed also on the columnar spacers 10, the parts of the alignment layer 113 on the columnar spacers 10 have become extremely thin due to the leveling effect. The optical alignment treatment is used for the alignment treatment of the alignment layer 113 on the counter substrate 200's side similarly to the treatment of the alignment layer 113 on the TFT substrate 100's side. Since the liquid crystal alignment is disturbed around each columnar spacer 10, the black matrix 202 is formed on corresponding parts of the counter substrate 200 in order to prevent the light leakage. This embodiment will be explained in more detail below by using specific examples.

Example 1

Figure 2:
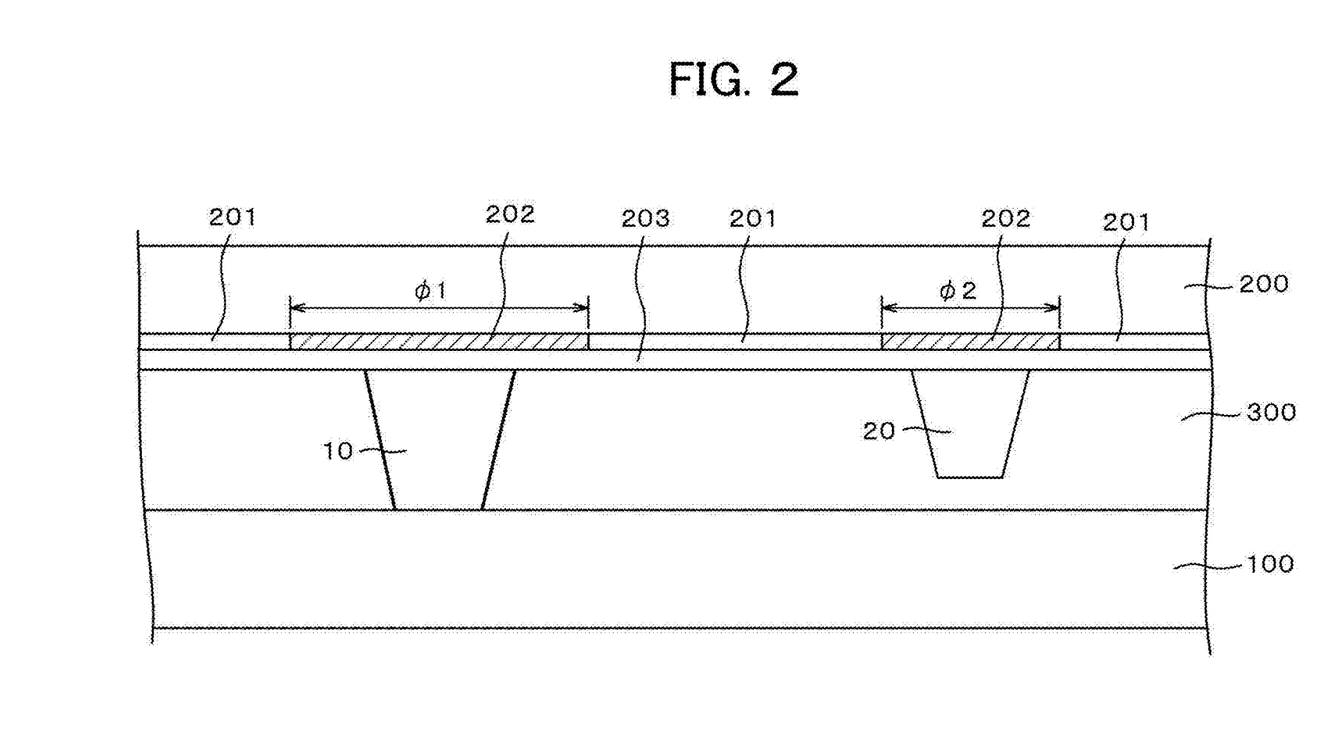
FIG. 2 is a cross-sectional schematic diagram of a region of the liquid crystal display device around a columnar spacer.

FIG. 2 is a cross-sectional view of a region of the liquid crystal display device around a columnar spacer for determining the distance between the TFT substrate 100 and the counter substrate 200. On the counter substrate 200's side in FIG. 2, the color filters 201 and the black matrix 202 are formed and the overcoat film 203 is formed to cover the color filters 201 and the black matrix 202. On (under) the overcoat film 203, the first columnar spacers 10 and the second columnar spacers 20 slightly lower (thinner) than the first columnar spacers 10 are formed. The height (thickness) of the second columnar spacers 20 is approximately 0.3-0.5 µm less than that of the first columnar spacers 10. Therefore, the second columnar spacers 20 are not in contact with the TFT substrate 100's side in the normal state.

The detailed structure of the TFT substrate 100's side is unshown in FIG. 2. On the TFT substrate 100's side, there are cases where mounts are formed in regions for contacting the columnar spacers. However, such mounts are unshown in FIGS. 1 and 2. FIG. 2 is a cross-sectional view showing the normal state of the liquid crystal display device, in which the distance between the TFT substrate 100 and the counter substrate 200 is determined by the first columnar spacers 10. In other words, the height of the first columnar spacers 10 in the liquid crystal layer is greater than that of the second columnar spacers 20 in the liquid crystal layer.

In FIG. 2, the liquid crystal alignment is disturbed and the light leakage occurs in the regions around the first columnar spacers 10 and the second columnar spacers 20, and thus the black matrix 202 is formed on the counter substrate 200 in order to prevent the light leakage. For example, when pushing pressure is applied to the counter substrate 200 from outside, the first columnar spacers 10 are deformed, the second columnar spacers 20 make contact with the TFT substrate 100, and the distance between the TFT substrate 100 and the counter substrate 200 is maintained against the external pushing pressure.

When pushing pressure is applied from outside, the first columnar spacers 10 are deformed and thus the light leakage caused by the disturbance in the liquid crystal alignment increases with the deformation of the first columnar spacers 10. Therefore, the diameter φ1 of each part of the black matrix 202 corresponding to each first columnar spacer 10 has been set greater than the diameter φ2 of each part of the black matrix 202 corresponding to each second columnar spacer 20. Thus, as far as a single columnar spacer is concerned, the first columnar spacer 10 has a greater influence on the transmittance than the second columnar spacer 20.

Figure 3:
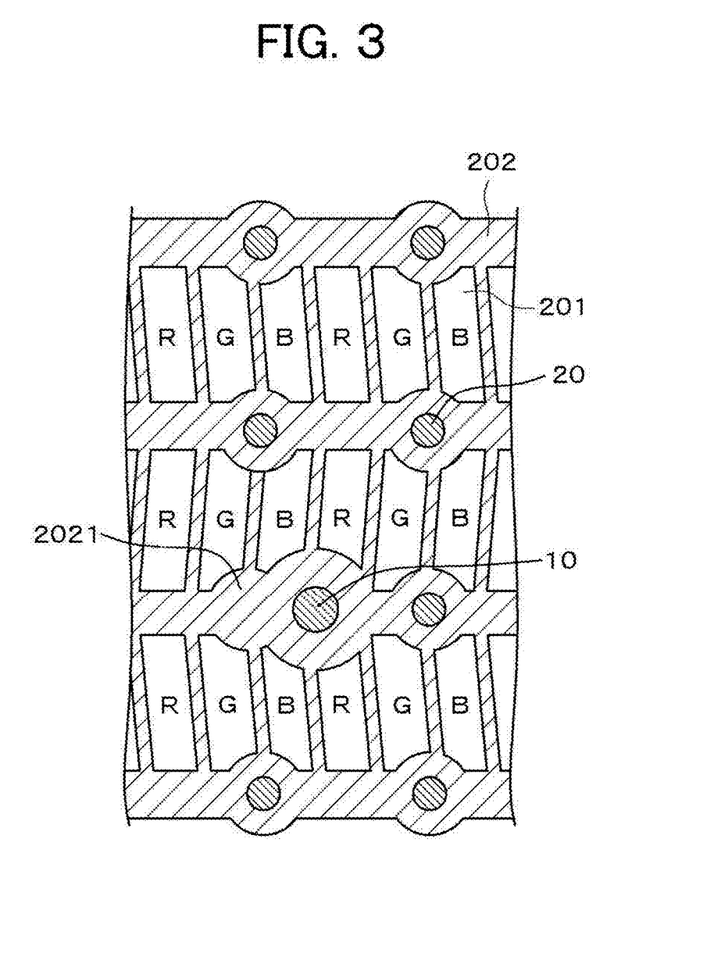
FIG. 3 is a plan view showing a counter substrate's side of a liquid crystal display device according to an example of the present invention.

FIG. 3 is a plan view showing the counter substrate 200's side of a liquid crystal display device according to an example of the present invention. In FIG. 3, red color filters, green color filters and blue color filters are formed corresponding to the red pixels (R), the green pixels (G) and the blue pixels (B). The black matrix 202 is formed to be situated between adjacent color filters 201.

In FIG. 3, the columnar spacers are formed in boundary regions situated at corners of adjoining pixels and the black matrix 202 is formed corresponding to the columnar spacers. The number of the second columnar spacers 20 formed is greater than that of the first columnar spacers 10 since the second columnar spacers 20 are required to withstand the pushing pressure from outside. The number of the second columnar spacers 20 is ten times or more of that of the first columnar spacers 10. Further, the diameter of each part of the black matrix 202 corresponding to each first columnar spacer 10 is greater than that of each part of the black matrix 202 corresponding to each second columnar spacer 20 since the first columnar spacers 10 are deformed significantly when the pushing pressure is applied from outside. In FIG. 3, all the spacers except the one indicated as a first columnar spacer 10 are second columnar spacers 20.

While no second columnar spacer 20 exists at a boundary between a red pixel (R) and a green pixel (G) in FIG. 3, there can be a second columnar spacer 20 existing at a boundary between a red pixel (R) and a green pixel (G). Characteristics of the configuration shown in FIG. 3 are as follows: The second columnar spacer 20 can exist at a boundary between a green pixel (G) and a blue pixel (B), a boundary between a red pixel (R) and a blue pixel (B) or a boundary between a green pixel (G) and a red pixel (R), whereas the first columnar spacer 10 exists only at a boundary between a red pixel (R) and a blue pixels (B) (not existing at a boundary between a green pixel (G) and a red pixel (R) or a boundary between a green pixel (G) and a blue pixels (B)).

Since the number of the first columnar spacers 10 is small, the first columnar spacers 10 are formed at greater pitches (intervals) and in greater sizes compared to the second columnar spacers 20. Therefore, the diameter of each black matrix part 202 (each part of the black matrix 202) corresponding to each first columnar spacer 10 is also greater than that of each black matrix part 202 corresponding to each second columnar spacer 20. The human's visual sensitivity for green is high. Thus, if the first columnar spacers 10 are formed corresponding to green pixels (G), stripe-like unevenness can occur in cases of special display patterns (as will be explained later) due to the existence of the black matrix 202 at the boundaries of the green pixels (G) corresponding to the first columnar spacers 10. Such stripe-like unevenness due to the influence of the first columnar spacers 10 is hardly recognized in regard to the red pixels (R) or the blue pixels (B) since the human's visual sensitivity for red or blue is lower than that for green.

Figure 4:
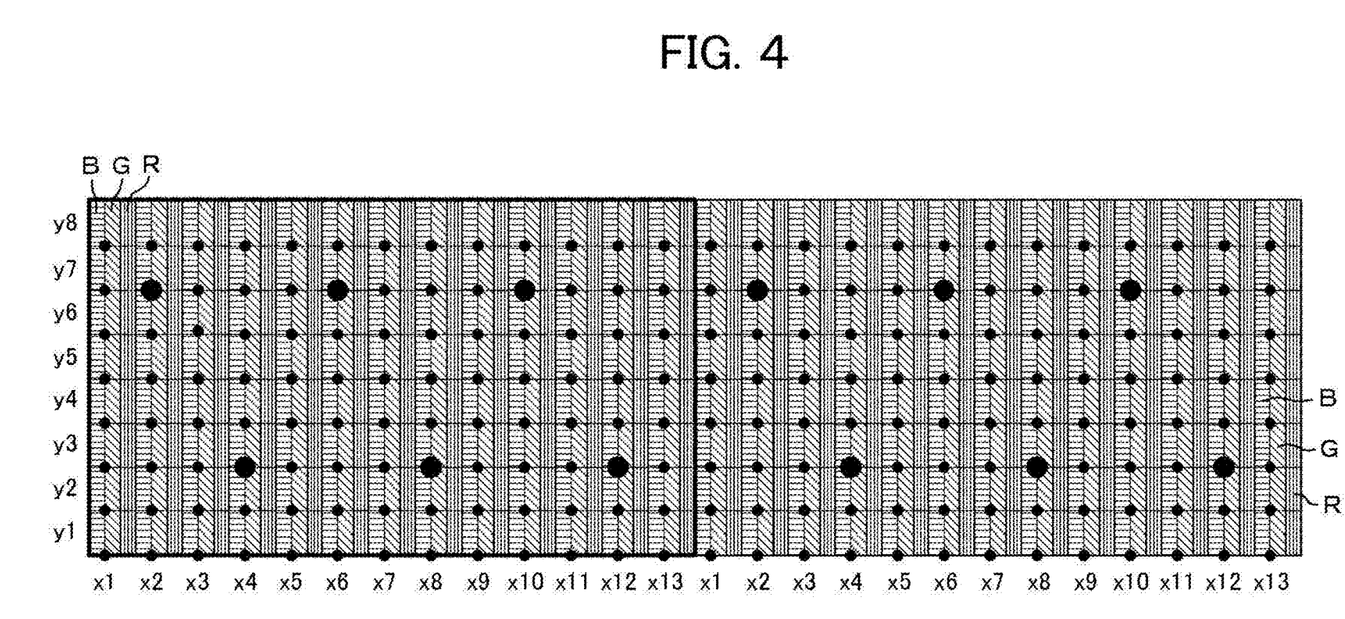
FIG. 4 is a plan view showing a comparative example.
Figure 5:
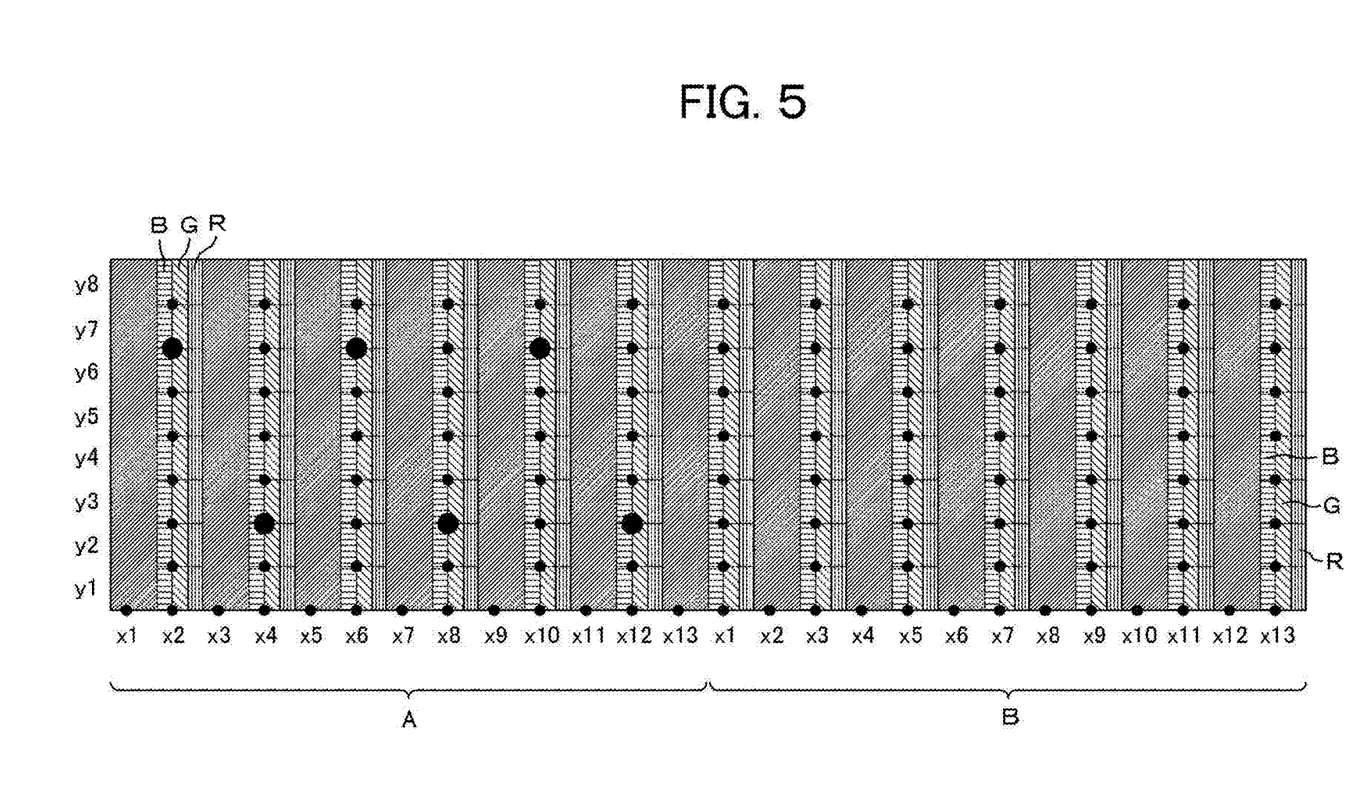
FIG. 5 is a plan view showing a problem with the comparative example.

FIGS. 4 and 5 schematically shows an example of a problem arising when the first columnar spacers 10 are arranged at boundaries of green pixels (G). FIG. 4 is a plan view of the counter substrate 200, in which the red color filters, the green color filters and the blue color filters extend in the vertical direction in a stripe pattern. In FIG. 4, the large dots represent black matrix parts 202 (parts of the black matrix 202) corresponding to the first columnar spacers 10, while the small dots represent black matrix parts 202 corresponding to the second columnar spacers 20.

The screen shown in FIG. 4 is formed by iteration of a pixel unit that is made up of 13×8 RGB pixel sets (13 RGB pixel sets arranged in the horizontal direction×8 RGB pixel sets arranged in the vertical direction). In FIG. 4, horizontal coordinates x1-x13 for specifying the position of a pixel set in the horizontal direction and vertical coordinates y1-y8 for specifying the position of a pixel set in the vertical direction are shown. In the example shown in FIG. 4, the second columnar spacers 20 are formed at the boundaries between a green pixel (G) and a blue pixels (B), while the first columnar spacers 10 are formed at boundaries between a green pixel (G) and a blue pixels (B) at intervals of four pixel sets in the horizontal direction and in the vertical direction.

It is assumed here that an image signal for displaying a vertically extending white pattern and a vertically extending black pattern alternately (displaying the white pattern every other pixel set and the black pattern every other pixel set) is inputted to the screen shown in FIG. 4. FIG. 5 shows the light transmission status of each pixel in this case. In FIG. 5, the vertically extending white pattern has been formed every other pixel set and the vertically extending black pattern has been formed every other pixel set. The hatched regions in FIG. 5 represent the black patterns, while the regions with the indication "RGB" represent the white patterns.

In the example of FIG. 5, black matrix parts 202 corresponding to first columnar spacers 10 have been formed in the white patterns in the left half of the screen, whereas no black matrix parts 202 corresponding to first columnar spacers 10 have been formed in the white patterns in the right half of the screen. The left half of the screen becomes darker than the right half of the screen since the area of each black matrix part 202 corresponding to a first columnar spacer 10 is larger than the area of each black matrix part 202 corresponding to a second columnar spacer 20. As a result, a bright pattern horizontally extending for 13 pixel sets and a dark pattern horizontally extending for 13 pixel sets are repeated alternately. In other words, the image displayed on the screen does not represent the video signal (image signal) with high fidelity.

While FIGS. 4 and 5 have illustrated an example in which such a bright-dark pattern stands out due to the human's high visual sensitivity for green, such a phenomenon hardly stands out when it occurs in other colors. Therefore, the occurrence of such a bright-dark pattern is suppressed in this embodiment by not arranging the first columnar spacers 10 at green pixels (G). In other words, in the present invention, the large-area black matrix parts corresponding to the first columnar spacers 10 are not arranged at green pixels (G).

Figure 6:
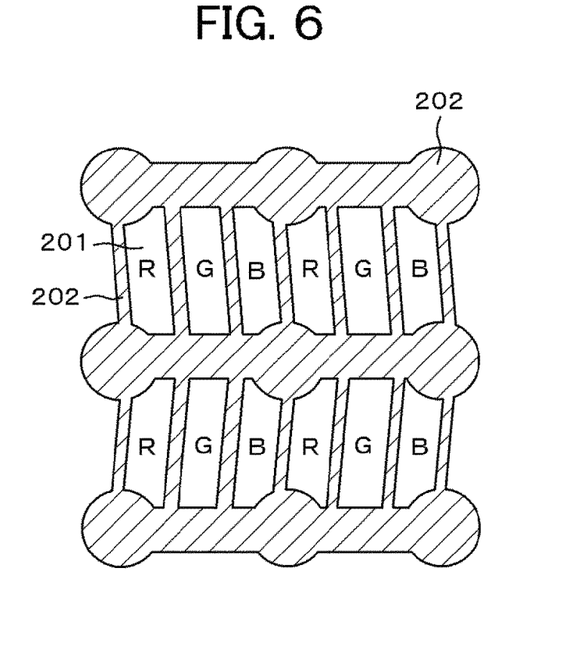
FIG. 6 is a plan view showing another comparative example.
Figure 7:
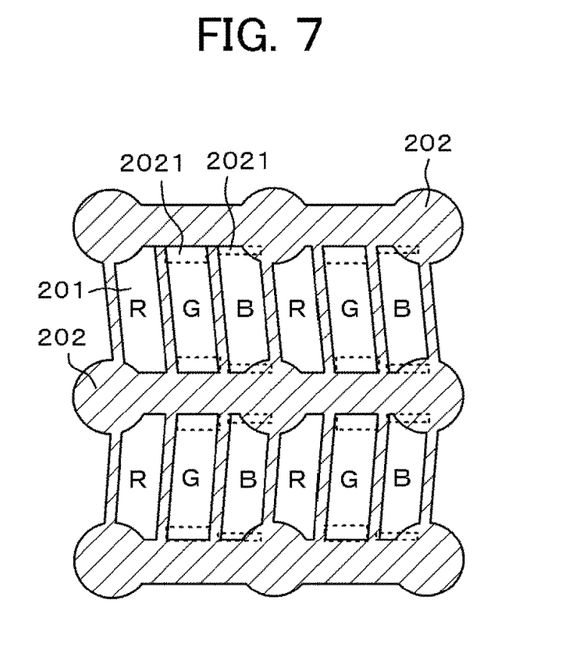
FIG. 7 is a plan view showing a problem with the comparative example of FIG. 6.

On the other hand, in the case where no first columnar spacers 10 are arranged at the boundaries of the green pixels (G), the transmittance of the green pixels (G) becomes higher compared to pixels of the other colors. Such a situation is shown in FIG. 6. In this case, it becomes necessary to form a light blocking pattern 2021 for each green pixel (G) as shown in FIG. 7 in order to attain an appropriate color balance. In the example of FIG. 7 for attaining the appropriate color balance, an opening adjustment region 2021 as a relatively large light blocking pattern is formed in each green pixel (G), an opening adjustment region 2021 as a relatively small light blocking pattern is formed in each blue pixel (B), and no light blocking pattern is formed in each red pixel (R). However, the method of FIG. 7 leads to a drop in the overall transmittance of the screen.

In order to avoid the drop in the overall transmittance of the screen, the appropriate color balance is attained in this embodiment by using the light blocking pattern (black matrix) 202 corresponding to the second columnar spacers 20 as shown in FIG. 3. Specifically, it is easy to arrange the second columnar spacers 20 so as to attain the appropriate color balance since the number of the second columnar spacers 20 is ten times or more of that of the first columnar spacers 10 and the degree of freedom of arrangement of the second columnar spacers 20 is high.

In the conventional example in which the alignment layers 113 are treated by means of the rubbing treatment, the aforementioned "tailing" light leakage due to the parts hidden by the columnar spacers and not undergoing the rubbing occurred in regard to both the first columnar spacers and the second columnar spacers. In other words, neither a first columnar spacer 10 nor a second columnar spacer 20 could be arranged at a green pixel (G) in the conventional example. Thus, in order to attain the appropriate color balance in the conventional example, large light blocking regions 2021 had to be formed especially for the green pixels (G) and that led to a significant drop in the screen luminance.

In contrast, the second columnar spacers 20 can be arranged also at green pixels (G) in this embodiment, and thus the need of forming the light blocking patterns 2021 for the green pixels (G) in order to attain the appropriate color balance is eliminated or the area of the light blocking patterns 2021 for the green pixels (G) can be small even when the light blocking patterns 2021 are formed. Specifically, this is because the appropriate color balance can be attained in this embodiment by the method of arranging the second columnar spacers 20.

In FIG. 3, the boundaries between a green pixel (G) and a blue pixel (B) include a part where a light blocking region 2021 is formed even though no second columnar spacer 20 exists there. This part corresponds to the aforementioned opening adjustment region 2021 in the conventional example. However, this is means that is taken when the appropriate color balance cannot be sufficiently attained only by the arrangement of the second columnar spacers 20 (rather exceptional case). Thus, even in cases where such a light blocking pattern 2021 is formed, forming the pattern 2021 only in a limited area is enough. Overall, the appropriate color balance can be attained by the arrangement of the black matrix 202 (black matrix parts 202) corresponding to the second columnar spacers 20. Accordingly, the transmittance of the screen hardly drops.

As described above, according to this embodiment, a liquid crystal display device having high screen luminance while attaining an appropriate color balance can be realized.

While the above description of the embodiment has been given by taking a liquid crystal display device of the IPS type as an example, the present invention is applicable also to various other types of liquid crystal display devices as long as the liquid crystal display device employs the optical alignment method. While the first columnar spacers and the second columnar spacers are formed on the counter substrate's side of the display device in the above description, the present invention is applicable also to cases where the first columnar spacers and the second columnar spacers are formed on the TFT substrate's side of the display device. Arranging the color filters on the TFT substrate's side of the display device is also possible. While circular (cylindrical) spacers have been shown as examples of the columnar spacers in the above description, the columnar spacers may also be formed to have other cross-sectional shapes (polygonal, elliptical, etc.). It is also possible to arrange elliptical or rectangular spacers on one substrate while forming elliptical or rectangular spacers at different angles (angles shifted from those of the former elliptical or rectangular spacers by a prescribed angle) on the other substrate. While the cross-sectional area of the first spacer measured at a prescribed height may be set greater than that of the second spacer measured at the prescribed height as in the above embodiment, the first and second spacers may also be formed as spacers of the same cross-sectional area differing only in the height. The present invention is applicable also to configurations in which white pixels, each arranged between a blue pixel and a red pixel, are formed in addition to the RGB (red, green and blue) pixels.

What is claimed is:

1. A liquid crystal display device comprising:
   a first substrate comprising a first spacer, a second spacer, and a black matrix having a first dot pattern and a second dot pattern, a second substrate;
   a liquid crystal layer between the first substrate and the second substrate, wherein the second spacer has a lower height in the liquid crystal layer than the first spacer, the first spacer is disposed on the first dot pattern, the second spacer is disposed on the second dot pattern, an area of the first dot pattern is larger than an area of the second dot pattern; and
   the black matrix further having a third dot pattern, an area of the third dot pattern is substantially the same as the area of the second dot pattern, a part of the third dot pattern and a part of the first dot pattern are commonly shared between the first dot pattern and the third dot pattern.

2. The liquid crystal display device according to claim 1, the first substrate further comprising red pixels, green pixels, and blue pixels, wherein the red pixels, the green pixels, and the blue pixels are arranged in parallel on the first substrate, the first spacer exists at a boundary between a red pixel and a blue pixel, and
   the second spacer exists at a boundary between a green pixel and a red pixel, or a boundary between a blue pixel and a green pixel.

3. The liquid crystal display device according to claim 2, wherein the second spacer is not disposed on the third dot pattern.

4. The liquid crystal display device according to claim 3, wherein the first spacer and the second space are formed on the first substrate.

5. The liquid crystal display device according to claim 4, the first substrate further comprising a plurality of first spacers and a plurality of second spacers, the number of the plurality of second spacers is ten or more times the number of the plurality of first spacers.

6. The liquid crystal display device according to claim 5, wherein the liquid crystal display device is an IPS (In-Plane Switching) type liquid crystal display device.

7. The liquid crystal display device according to claim 6, the first substrate further having an optical alignment layer, a second substrate further having an optical alignment layer.

8. The liquid crystal display device according to claim 1, wherein the third dot pattern and the first dot pattern are gourd shapes in a plan view.

* * * * *